Patented Apr. 5, 1932

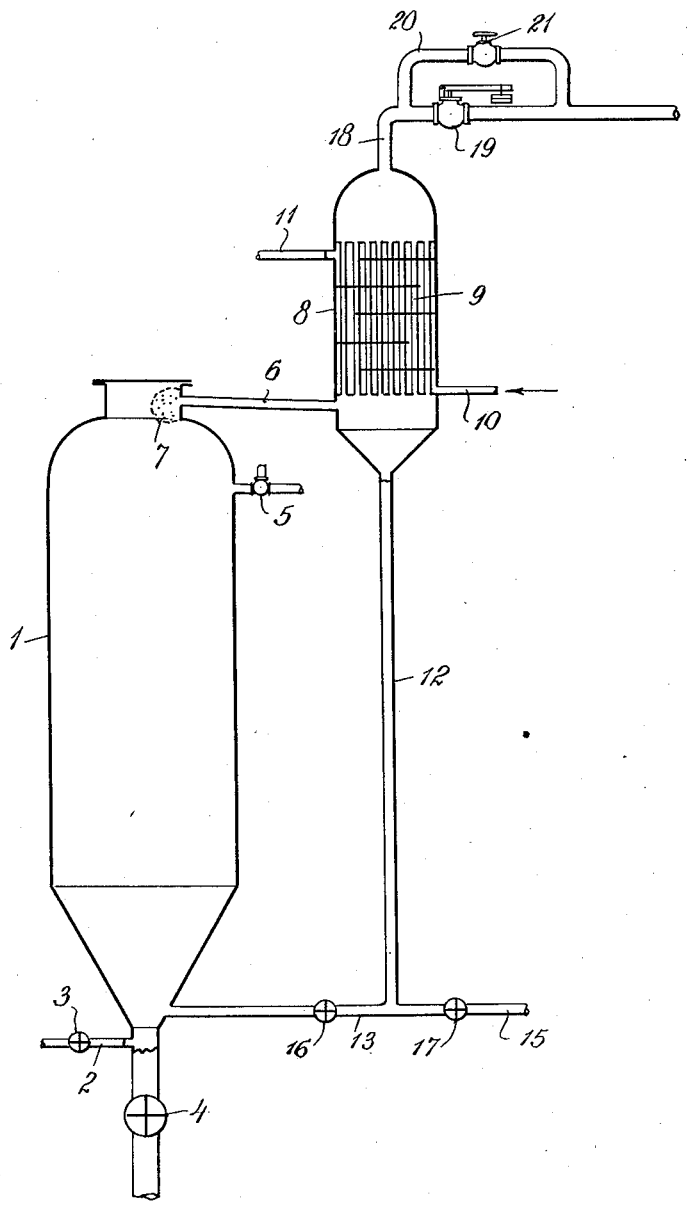

1,852,011

UNITED STATES PATENT OFFICE

RAYMOND S. HATCH, OF EAST ORANGE, NEW JERSEY, ASSIGNOR TO LIGNO-CELLULOSE CORPORATION, OF NEW YORK, N. Y., A CORPORATION OF DELAWARE

METHOD AND APPARATUS FOR PRODUCING CELLULOSE FROM LIGNIFIED MATERIAL

Application filed April 8, 1931. Serial No. 528,503.

This invention relates to the production of cellulose from lignified material and particularly to an improved method and apparatus therefor.

In the well known sulphite method for the production of cellulose a raw material is treated at suitable temperature and pressure with a solution containing a bisulphite of an alkali or alkaline earth metal or of a mixture of such compounds containing more or less free sulphur dioxide. The solution in common use contains from 1 to 2% of sulphur dioxide as so called "combined" that is, sulphur dioxide combined with calcium or magnesium or both, and from 3 to 6% of sulphur dioxide as "free" or sulphur dioxide in excess of that required to combine with the bases present in the solution to form bisulphites.

In the sulphite method as usually conducted, the raw material, for example wood chips, is introduced to a digester with a suitable amount of the solution or "acid", and steam is introduced to raise the temperature. As soon as the fixed gases are eliminated, the digester is closed and pressure is developed by the release of sulphur dioxide gas or vapors from the acid. The introduction of steam continues and when the pressure reaches a predetermined point the digester is relieved by withdrawing excess vapors containing sulphur dioxide. Some of the liquid accumulated by the condensation of steam in the digester is also removed from time to time in order that the desired level may be maintained. Ordinarily the pressure rises to 70 to 80 pounds per square inch and the temperature may reach 145 to 150° C. As the "cook" advances, the proportion of free sulphur dioxide diminishes progressively. It is customary to provide elaborate recovery systems to absorb the sulphur dioxide relieved from the digester. After absorption the sulphur dioxide solution is stored and used as acid in subsequent operations.

Many factors affect the speed of cooking and the yield, but the proportion of free sulphur dioxide and the temperature are most important. Digesters in common use permit a working pressure of 70-80 pounds gauge per square inch. In one well known method it is the practice to start with acid containing approximately 4% free sulphur dioxide and to bring the temperature during the course of 12–14 hours to 145–150° C., during which time sulphur dioxide is relieved from the digester to keep within the pressure limit. The free sulphur dioxide content at the end of the cook is approximately 0.3% and the yield of cellulose averages about 43% of the wood substance. In another known method the acid contains at the start approximately 6% of free sulphur dioxide and the final temperature is about 140° C. The cooking time is lowered to from 9–10 hours, and the final sulphur dioxide concentration is approximately 1.3%. The yield of cellulose is about 45%. Cooking has also been carried on with 12% of free sulphur dioxide at the commencement of the operation. The cook is completed in 6–7 hours, with a final temperature of about 125° C. and with 4% of free sulphur dioxide in the acid at the conclusion of the cook. The yield in this case approximates 55%.

It is evident from the examples noted that increased yields in shorter cooking time result from lower final temperatures and increased concentration of free sulphur dioxide at the beginning and end of the operation. However, when high concentration of sulphur dioxide is used at the commencement of the operation, large amounts of gas have to be relieved from the digester during the cooking and under the present practice correspondingly increased facilities for absorbing the relief gas must also be provided. Any provision which will permit maintenance of a relatively high concentration of sulphur dioxide in the acid and consequent low temperature and decreased time of cooking will obviously afford a marked advantage in the operation.

Another important element is circulation to ensure thorough contact of the material with the acid. A quiescent state in the digester is not desirable because under such conditions the cook is uneven and the yield is low. It is desirable, therefore, to maintain continuous and thorough circulation.

It is the object of the present invention to provide an improved method and apparatus for the production of cellulose.

Another object of the invention is the provision of a method and apparatus which ensures a maximum and a substantially uniform concentration of free sulphur dioxide during the operation.

A further object of the invention is to facilitate circulation and therefore to ensure maximum effectiveness of the acid during the cook.

Other objects are a decrease in the temperature and time required for the cook, increase in yield, and assurance of uniform conditions and therefore of improved quality of the product.

In carrying out the invention, the several advantages are accomplished by the provision of means to condense the vapors relieved from the digester and to return the resulting liquid to the digester. It is well known that pure sulphur dioxide gas condenses to a liquid at pressures of 3–4 atmospheres and temperatures of 20–30° C. I have discovered that sulphur dioxide gas and water vapor also readily condense to form a homogeneous liquid at the pressures and temperatures mentioned. Digesters are commonly operated at sufficiently high pressures to permit condensation of the relief gases by cooling these gases to temperatures which are readily attainable by ordinary means such as cooling water. I therefore condense the relief gases by subjecting them to indirect heat exchange with a suitable cooling medium such as water and thus obtain a liquid which can be returned directly to the digester. This liquid contains the sulphur dioxide originally present in the acid, and the sulphur dioxide is consequently re-employed directly in the treatment of the cellulose-containing material. As this liquid resulting from the condensation of the vapors enters the digester while the latter is at a relatively high temperature, the sulphur dioxide content is largely converted into gas which bubbles upwardly through the mass of material in the digester and thoroughly agitates the material, thus ensuring uniform effect of the acid. The vapors relieved from the digester are recondensed and again returned, so that the sulphur dioxide travels in a continuous cycle during the operation. All of the sulphur dioxide content of the acid initially employed is retained in the system, and the concentration is maintained, therefore, except for such portion of the sulphur dioxide as may be consumed by the reaction involved in the treatment of the material and such slight losses as are otherwise incidental to the procedure.

The invention will be better understood by reference to the drawing, which illustrates diagrammatically an apparatus adapted for the practice of the method.

Referring to the drawing, 1 is a digester of the usual form and construction comprising a shell with an acid-proof lining. Steam is introduced through an inlet 2 controlled by a valve 3, and the product may be discharged through a "blow-off" valve 4 at the bottom of the digester. A "side relief" 5 is provided to permit withdrawal of excess liquid arising from the condensation of steam in the digester. The gas relief line 6 is provided with a screen 7 to prevent clogging with fibre, and a condenser 8 comprising a shell and a plurality of tubes 9 is connected to the gas relief line 6. A suitable cooling medium such as water is supplied through a pipe 10 and escapes through a pipe 11 after passing about the tubes for indirect heat exchange with the gas and vapor flowing through the tubes. Most of the gas and vapor is thus condensed and returns as liquid through a pipe 12. A pipe 13 is connected to the lower end of the pipe 11 and to the digester, so that the condensate may be returned directly thereto. A pipe 15 permits withdrawal of the condensate. The pipes 13 and 15 are controlled by valves 16 and 17. At the top of the condenser 8 a pipe 18 is connected to permit the withdrawal of incondensible residue and is controlled by a pressure reducing valve 19 of any suitable form and construction and adapted to maintain automatically the desired pressure in the condenser 8. A by-pass 20 controlled by a valve 21 permits the withdrawal of fixed gases during the initial stage of the operation.

The method may be carried out in the apparatus as follows: The proper amounts of material to be treated, for example wood chips, and of the acid are charged into the digester which is then closed. The by-pass valve 21 is opened and steam is admitted through the inlet 2 into the digester. Air and some gas are withdrawn through the by-pass until substantially all of the incondensible gas has been displaced. The by-pass valve 21 is then closed, and the digester is brought up to the pressure for which the valve 19 is set by the gas liberated as the result of introducing steam to the digester. As the temperature of the digester rises, sulphur dioxide is driven off and passes into the condenser 8 where the gas and water vapor are condensed by indirect heat exchange with the cooling medium circulating about the tubes of the condenser. The condensate returns from the condenser and is introduced through the pipe 13 to the bottom of the digester. The acid in the digester is, however, saturated for the pressure and temperature therein and consequently the sulphur dioxide in the condensate is gasified and rises in large bubbles and through the mass of chips and acid and maintains active circulation of the contents of the digester. The pressure in the system tends to rise owing to the liberation of non-condensible gases until the valve 19 opens and relieves the excess pressure. The gases thus relieved may be conveyed to any suitable recovery system. As soon as the excess pressure is relieved the valve 19 closes automatically and condensation of the sulphur dioxide and water vapor proceed as before. From time to time the valve 5 is opened to relieve sufficient acid so as to maintain the desired level in the digester. The acid thus withdrawn may be introduced to a suitable separator (not shown) where the sulphur dioxide released at the lowered pressure is separated and recovered. When resolution is complete the circulation of the condensate is stopped and the condensate is delivered through the pipe 15 to a suitable storage vessel or recovery system until the pressure in the digester and condenser falls to a point where the gas will no longer condense. At this point the valve 21 is opened and the residual sulphur dioxide gas is "blown down" to a suitable recovery system, after which the contents are discharged through the outlet valve 4.

During the process of resolution in the digester a certain amount of sulphur dioxide combines with the lignin and disappears from the process as free sulphur dioxide. This sulphur dioxide of combination, together with unavoidable losses of gas throughout the process, is usually expressed as sulphur consumption per ton of pulp made. In practice this will vary from 220–300 pounds per ton, depending upon the character of the wood and the care with which the recovery system is operated. Aside from this consumption and the unavoidable losses, the sulphur dioxide originally introduced to the digester is maintained therein by the circulation of the condensate as hereinbefore described. Consequently at the end of the cook the free sulphur dioxide in the acid may be as high as 5.7% or even higher where the total free sulphur dioxide initially amounted to 7%. As previously stated, the maintenance of this high proportion of sulphur dioxide in the acid during the operation is extremely advantageous. It permits more rapid cooking at a lower temperature and produces a more uniform product, it being possible to carry on the process with a maximum temperature of about 125–130° C. at 75 pounds gauge pressure and to complete the cook in from 6–7 hours.

The conditions of temperature, pressure, and initial and final concentration of free sulphur dioxide may vary quite widely, the figures mentioned being merely examples of the preferred procedure. Necessarily the conditions of operation are affected by the character of the material treated and must be adjusted. The advantages are attained by the condensation and return of the vapors relieved from the digester during the cooking operation, even when the operating conditions are modified.

The method as herein described in connection with "acid" containing bisulphites of alkali or alkaline earth metals may be employed also and with equal advantage to the procedure in which a water solution of sulphur dioxide free from inorganic bases is used as the resolving agent. Such a method is described in U. S. application Serial No. 460,976 filed June 13, 1930. The term "sulphite method" as used in the accompanying claims includes the use of solutions of sulphur dioxide whether or not inorganic bases are present.

Various changes may be made in the details of the method and apparatus without departing from the invention or sacrificing any of the advantages thereof.

I claim:

1. The method of producing cellulose from lignified material which comprises digesting the material in a solution of a bisulphite of an alkali or alkaline earth metal containing free $SO_2$, heating the solution, relieving the vapors carrying $SO_2$ and condensing the vapors to liquid by indirect heat interchange with a cooling medium, and returning the liquid directly to the material undergoing treatment, said liquid including the condensed $SO_2$ substantially uncombined except to the extent that it may be combined with water of condensation.

2. The method of producing cellulose from lignified material which comprises disgesting the material in a solution of a bisulphite of an alkali or alkaline earth metal containing free $SO_2$, heating the solution and maintaining a circulation of the gaseous $SO_2$ released by heating in a closed cycle including the material being treated, said $SO_2$ being substantially uncombined except to the extent that it may be combined with water.

3. The method of producing cellulose from lignified material which comprises digesting the material in a solution of a bisulphite of an alkali or alkaline earth metal containing free $SO_2$, heating the solution and maintaining a circulation of the gaseous $SO_2$ released by heating in a closed cycle including the material being treated by condensing the vapors containing $SO_2$ and returning the liquid produced to the material, said liquid including the condensed $SO_2$ substantially uncombined except to the extent that it may be combined with water of condensation.

4. The method of producing cellulose from lignified material which comprises digesting the material in a solution of a bisulphite of an alkali or alkaline earth metal containing free $SO_2$, heating the solution and agitating the material by condensing and returning the $SO_2$ released from the solution substantially uncombined except with water of condensation and permitting the gaseous $SO_2$ derived therefrom to bubble through the material.

5. The method of producing cellulose from lignified material which comprises digesting the material in a solution containing free $SO_2$, heating the solution, relieving the vapors carrying $SO_2$, condensing the vapors to liquid by indirect heat exchange with a cooling medium, and returning the liquid directly to the material undergoing treatment, said liquid including the condensed $SO_2$ substantially uncombined except to the extent that it may be combined with water of condensation.

6. The method of producing cellulose from lignified material which comprises digesting the material in a solution containing free $SO_2$, heating the solution and maintaining a circulation of the gaseous $SO_2$ released by heating in a closed cycle including the material being treated, said $SO_2$ being substantially uncombined except to the extent that it may be combined with water.

7. The method of producing cellulose from lignified material which comprises digesting the material in a solution containing free $SO_2$, heating the solution and maintaining a circulation of the gaseous $SO_2$ released by heating in a closed cycle including the material being treated by condensing the vapors containing $SO_2$ and returning the liquid produced to the material, said liquid including the condensed $SO_2$ substantially uncombined except to the extent that it may be combined with water of condensation.

8. The method of producing cellulose from lignified material which comprises digesting the material in a solution containing free $SO_2$, heating the solution and agitating the material by condensing and returning the $SO_2$ released from the solution substantially uncombined except with water of condensation and permitting the gaseous $SO_2$ derived therefrom to bubble through the material.

9. In the sulphite method of producing cellulose, the procedure comprising circulation of $SO_2$ in a closed cycle by condensing the relief vapors containing $SO_2$ and returning the liquid resulting from condensation with the $SO_2$ therein being substantially uncombined except to the extent that it may be combined with water of condensation.

10. In the sulphite method of producing cellulose, the step of maintaining the concentration of $SO_2$ by condensing and returning the relief vapors, said vapors containing the $SO_2$ uncombined except to the extent that it may be combined with water of condensation.

11. In an apparatus for producing cellulose the combination of a digester, means for relieving vapors from the digester, means for condensing the vapors by indirect heat exchange with a cooling medium, including a heat exchanger and means for supplying the cooling medium thereto, and means for maintaining a predetermined pressure in the heat exchanger.

12. In an apparatus for producing cellulose the combination of a digester, means for relieving vapors from the digester, means for condensing the vapors by indirect heat exchange with a cooling medium, including a heat exchanger and means for supplying the cooling medium thereto, and means including an automatic pressure relief valve in the outlet from the heat exchanger for maintaining a predetermined pressure in the heat exchanger.

In testimony whereof I affix my signature.

RAYMOND S. HATCH.